US012674065B2

(12) United States Patent
Adamson et al.

(10) Patent No.: US 12,674,065 B2
(45) Date of Patent: Jul. 7, 2026

(54) TWO-DIMENSIONAL SHEET STABILIZED EMULSION BASED INKS

(71) Applicant: University of Connecticut, Farmington, CT (US)

(72) Inventors: Douglas H. Adamson, Mansfield Center, CT (US); Feiyang Chen, Vernon, CT (US); Elizabeth Brown, Mansfield Center, CT (US)

(73) Assignee: University of Connecticut, Farmington, CT (US)

( * ) Notice: Subject to any disclaimer, the term of this patent is extended or adjusted under 35 U.S.C. 154(b) by 22 days.

(21) Appl. No.: 18/102,389

(22) Filed: Jan. 27, 2023

(65) Prior Publication Data

US 2023/0235186 A1 Jul. 27, 2023

Related U.S. Application Data

(63) Continuation of application No. 16/759,684, filed as application No. PCT/US2018/058532 on Oct. 31, 2018, now abandoned.

(60) Provisional application No. 62/580,214, filed on Nov. 1, 2017.

(51) Int. Cl.
| *H01B 1/24* | (2006.01) |
| *C08K 3/38* | (2006.01) |
| *C09D 11/023* | (2014.01) |
| *C09D 11/38* | (2014.01) |
| *C09D 11/52* | (2014.01) |

(52) U.S. Cl.
CPC .............. *C09D 11/023* (2013.01); *C08K 3/38* (2013.01); *C09D 11/52* (2013.01); *H01B 1/24* (2013.01)

(58) Field of Classification Search
CPC . H01B 1/18; H01B 1/24; C09D 5/022; C09D 5/24; C09D 11/023; C09D 11/033; C09D 11/38; C09D 11/52; C08K 3/04; C08K 3/042; C08K 3/38; C08K 2003/382; C08K 2003/285; C09K 23/002
See application file for complete search history.

(56) References Cited

U.S. PATENT DOCUMENTS

| 5,698,016 | A | * | 12/1997 | Adams | C09D 11/324 |
| | | | | | 347/100 |
| 5,718,747 | A | | 2/1998 | Okusawa | |
| 7,186,415 | B1 | * | 3/2007 | Gers-Barlag | A61K 8/25 |
| | | | | | 424/59 |
| 7,655,082 | B2 | * | 2/2010 | Zhu | C09D 11/18 |
| | | | | | 106/31.25 |
| 8,344,033 | B2 | * | 1/2013 | Gottschalk-Gaudig | |
| | | | | | A61K 9/1075 |
| | | | | | 514/939 |

| 9,260,551 | B2 | * | 2/2016 | Cathala | C08F 36/04 |
| 9,646,735 | B2 | | 5/2017 | Adamson et al. | |
| 9,685,261 | B2 | | 6/2017 | Adamson et al. | |
| 2011/0143051 | A1 | * | 6/2011 | Ohashi | C09D 11/0235 |
| | | | | | 252/512 |
| 2012/0245058 | A1 | * | 9/2012 | Monteiro | C09K 8/032 |
| | | | | | 507/131 |
| 2012/0289613 | A1 | * | 11/2012 | Huang | A61K 9/10 |
| | | | | | 977/948 |
| 2013/0210639 | A1 | | 8/2013 | Link et al. | |
| 2013/0337158 | A1 | * | 12/2013 | Eiden | B22F 1/0545 |
| | | | | | 252/514 |
| 2014/0199251 | A1 | * | 7/2014 | Ashida | C09D 17/00 |
| | | | | | 424/59 |
| 2014/0242016 | A1 | * | 8/2014 | Binks | A61K 8/064 |
| | | | | | 424/68 |
| 2014/0305571 | A1 | * | 10/2014 | Adamson | H01B 13/30 |
| | | | | | 427/601 |
| 2014/0305771 | A1 | | 10/2014 | Ng et al. | |
| 2015/0125498 | A1 | * | 5/2015 | Dejmek | A61K 8/022 |
| | | | | | 426/654 |
| 2015/0348669 | A1 | * | 12/2015 | Adamson | C08J 9/365 |
| | | | | | 252/511 |
| 2018/0327618 | A1 | | 11/2018 | McManus | |

FOREIGN PATENT DOCUMENTS

| WO | 2018143957 A1 | 8/2018 |
| WO | 2018222138 A1 | 12/2018 |

OTHER PUBLICATIONS

Woltornist et al. ("Conductive thin films of pristine graphene by solvent interface trapping," ACS Nano, vol. 7, No. 3, 7062-7066, 2013) (Year: 2013).*

(Continued)

*Primary Examiner* — Matthew R Diaz

(74) *Attorney, Agent, or Firm* — McCarter & English, LLP

(57) ABSTRACT

The present disclosure provides advantageous sheet stabilized emulsion based inks, and improved methods for fabricating and using such inks. More particularly, the present disclosure provides improved methods for fabricating conductive inks derived from water-in-oil emulsions stabilized by sheets exfoliated from layered materials (e.g., substantially pristine and non-oxidized graphite or hexagonal boron nitride), and related methods of use. A layered material (e.g., substantially pristine and non-oxidized graphite or hexagonal boron nitride) can be exfoliated into individual sheets, and these sheets can be utilized to stabilize water-in-oil emulsions. In certain embodiments, by utilizing long chain alkanes (e.g., hexadecane), one can advantageously fabricate emulsions with high viscosity and stability. In this form, the emulsions can be used as inks, thereby advantageously providing an inexpensive route to printing electrically conducting and/or insulating lines and shapes.

13 Claims, 10 Drawing Sheets

(56)          References Cited

OTHER PUBLICATIONS

International Search Report and Written Opinion from related
International Patent Application No. PCT/US018/058532 issued
Jan. 16, 2019.
Woltornist, S. J., Oyer, A. J., Carrillo, J.-M. Y., Dobrynin, A. V &
Adamson, D. H., Conductive Thin Films Of Pristine Graphene By
Solvent Interface Trapping, ACS Nano 7, 7062-6 (2013).

* cited by examiner

10

12

200 µm

UCONN 1 cm

TWO-DIMENSIONAL SHEET STABILIZED EMULSION BASED INKS

CROSS-REFERENCE TO RELATED APPLICATIONS

This application claims the benefit of U.S. patent application Ser. No. 16/759,684, entitled "Two-Dimensional Sheet Stabilized Emulsion Based Inks," filed Apr. 27, 2020, which claims priority to PCT/US2018/58532, filed Oct. 31, 2018, which in turn claims priority to U.S. Provisional application entitled "Two-Dimensional Sheet Stabilized Emulsion Based Inks," which was filed on Nov. 1, 2017, and assigned Ser. No. 62/580,214, the contents of which are herein incorporated by reference in their entirety.

STATEMENT REGARDING FEDERALLY SPONSORED RESEARCH

This invention was made with government support under Grant #DMR1535412 awarded by the National Science Foundation. The government has certain rights in the invention.

FIELD OF THE DISCLOSURE

The present disclosure relates to sheet stabilized emulsion based inks and related methods of use and fabrication and, more particularly, to conductive inks derived from water-in-oil emulsions stabilized by sheets exfoliated from layered materials (e.g., substantially pristine and non-oxidized graphite or hexagonal boron nitride), and related methods of fabrication.

BACKGROUND OF THE DISCLOSURE

In general, flexible displays and wearable sensors can require conductive materials that are able to bend and deform without cracking or breaking. Some potential and current applications include, for example, electronic and wearable textiles, 3D antennas and conformal printing, electromagnetic interference (EMI) shielding, 3D printed electronics, indium tin oxide (ITO) replacements, printed piezoresistives, bio sensors, printed memory, organic light-emitting diode (OLED) and large area LED lighting, and large area heaters.

Commercial conductive inks can contain metals (e.g., silver) suspended in a solution. These inks are expensive, can fail after repeated bending, can require high temperature annealing, and have been known to lead to irritation when placed next to the skin. Newly introduced graphitic based inks are derived from oxidized graphite, and are thus expensive, lack long-term stability, can require damaging post-application treatment, and do not have the high conductivity of pristine graphene.

Flexible patterns are often produced with inks loaded with high concentration of metals such as, for example, gold or silver. Conductive cloth can be produced by electroplating with metals such as, for example, silver or nickel. The use of metals can be costly as well as lead to skin irritation in some cases.

Thus, an interest exists for improved conductive inks, and related methods of use and fabrication. These and other inefficiencies and opportunities for improvement are addressed and/or overcome by the systems, assemblies and methods of the present disclosure.

SUMMARY OF THE DISCLOSURE

The present disclosure provides advantageous sheet stabilized emulsion based inks, and improved methods for fabricating and using such inks. More particularly, the present disclosure provides improved methods for fabricating conductive inks derived from water-in-oil emulsions stabilized by sheets exfoliated from layered materials (e.g., substantially pristine and non-oxidized graphite or hexagonal boron nitride), and related methods of use.

Research has shown that the insolubility of pristine graphene/graphite can be utilized as a means to fabricate water/oil emulsions, with graphene/graphite stabilizing the spheres formed, and with the emulsions utilized as the frameworks to make composites (e.g., foam composites). See, e.g., U.S. Pat. No. 9,646,735, the entire contents of which being hereby incorporated by reference in its entirety.

As described and disclosed in U.S. Pat. No. 9,646,735, by using an interface trapping method, the lack of solubility of pristine graphene/graphite can be utilized to both exfoliate and trap graphene/graphite, as well as form stable emulsions used as the framework for polymer/graphene/graphite composites (e.g., hollow polymer/graphene/graphite composites).

Other research has shown film climbing using an interface trapping method in a heptane and water mixture. See, e.g., U.S. Pat. No. 9,685,261, and Woltornist, S. J., Oyer, A. J., Carrillo, J.-M. Y., Dobrynin, A. V & Adamson, D. H., *Conductive Thin Films Of Pristine Graphene By Solvent Interface Trapping, ACS Nano* 7, 7062-6 (2013), the entire contents of each being hereby incorporated by reference in their entireties.

In exemplary embodiments of the present disclosure, a layered material (e.g., substantially pristine and non-oxidized graphite or substantially pristine and non-oxidized hexagonal boron nitride) is exfoliated into individual sheets (e.g., individual graphene sheets), and these sheets are utilized to stabilize water-in-oil emulsions.

In certain embodiments, by utilizing long chain alkanes (e.g., hexadecane, which is a chain of 16 carbon atoms), one can advantageously fabricate emulsions with high viscosity and stability. The viscosity can be similar to emulsions such as mayonnaise, and can also be similar to the viscosity found in inks used for screen-printing. In this form, the emulsions can be used as inks, thereby advantageously providing an inexpensive route to printing electrically conducting and/or insulating lines and shapes.

The present disclosure provides for a method for fabricating an ink including a) providing a phase separated system of two non-mixing solvents, the phase separated system including: (i) a first solvent and a second solvent, and (ii) an interface between the first and second solvents; b) introducing a layered material to the interface of the phase separated system; c) forming an emulsion of the first and second solvents, at least a portion of the layered material stabilizing the emulsion; and d) applying the emulsion to a substrate to form an electrically conductive pattern on the substrate.

The present disclosure also provides for a method for fabricating an ink wherein the first solvent is a long chain alkane and the second solvent is water. The present disclosure also provides for a method for fabricating an ink wherein the first solvent includes at least one alkane and the second solvent is water.

The present disclosure also provides for a method for fabricating an ink wherein the layered material is substantially pristine graphite or hexagonal boron nitride; and wherein after step c) the emulsion is stabilized by layers or sheets of the substantially pristine graphite or hexagonal boron nitride.

The present disclosure also provides for a method for fabricating an ink wherein the emulsion is formed via a formation step selected from the group consisting of hand mixing, hand shaking, mechanical mixing, mechanical shaking, and combinations thereof. The present disclosure also provides for a method for fabricating an ink wherein the emulsion is a water-in-oil emulsion.

The present disclosure also provides for a method for fabricating an ink wherein the emulsion is applied to the substrate via brushing or screen printing. The present disclosure also provides for a method for fabricating an ink wherein the substrate is flexible.

The present disclosure also provides for a method for fabricating an ink wherein the first solvent is hexadecane and the second solvent is water. The present disclosure also provides for a method for fabricating an ink wherein the first solvent includes heptane and hexadecane, and the second solvent is water.

The present disclosure also provides for a method for fabricating an ink wherein the emulsion has a steady state viscosity of about 4,000,000 cP shear thinning to around 15,000 cP. The present disclosure also provides for a method for fabricating an ink wherein the layered material introduced includes flakes, the flakes having a flake size of about 1 μm. The present disclosure also provides for a method for fabricating an ink wherein the layered material introduced includes graphite flakes, the graphite flakes having a flake size of about 1 μm.

The present disclosure also provides for a method for fabricating an ink wherein the first solvent includes alkanes larger than octadecane.

The present disclosure also provides for a method for fabricating an ink including a) providing a phase separated system of two non-mixing solvents, the phase separated system including: (i) a first solvent and a second solvent, and (ii) an interface between the first and second solvents; b) introducing a layered material to the interface of the phase separated system; c) forming an emulsion of the first and second solvents, at least a portion of the layered material stabilizing the emulsion; and d) applying the emulsion to a substrate to form an electrically conductive pattern on the substrate; wherein the first solvent is a long chain alkane and the second solvent is water; wherein the layered material is substantially pristine graphite or hexagonal boron nitride; wherein after step c) the emulsion is stabilized by layers or sheets of the substantially pristine graphite or hexagonal boron nitride; wherein the emulsion is formed via hand mixing; wherein the emulsion is a water-in-oil emulsion; wherein the emulsion is applied to the substrate via brushing or screen printing; wherein the substrate is flexible; wherein the emulsion has a steady state viscosity of about 4,000,000 cP shear thinning to about 15,000 cP; and wherein the layered material introduced includes flakes, the flakes having a flake size of about 1 μm.

Any combination or permutation of embodiments is envisioned. Additional advantageous features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

FIG. 12A is C7 ink; FIG. 12B is C10 ink; FIG. 12C is C12 ink; FIG. 12D is C14 ink; FIG. 12E is C16 ink.

DETAILED DESCRIPTION OF DISCLOSURE

Figure 1:
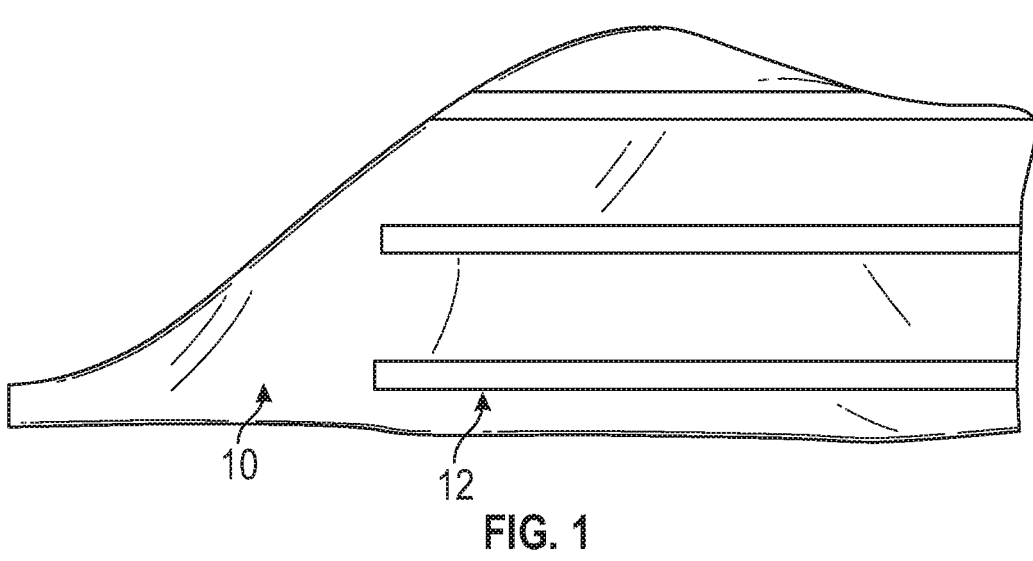
FIG. 1 shows exemplary lines of ink printed on a substrate.

The exemplary embodiments disclosed herein are illustrative of advantageous sheet stabilized emulsion based inks, and systems of the present disclosure and methods/techniques thereof. It should be understood, however, that the disclosed embodiments are merely exemplary of the present disclosure, which may be embodied in various forms. Therefore, details disclosed herein with reference to exemplary inks/fabrication methods and associated processes/techniques of assembly and use are not to be interpreted as limiting, but merely as the basis for teaching one skilled in the art how to make and use the advantageous inks/systems and/or alternative inks/systems of the present disclosure.

The present disclosure provides improved sheet stabilized emulsion based inks, and improved methods for fabricating and using such inks. More particularly, the present disclosure provides advantageous methods for fabricating conductive inks derived from water-in-oil emulsions stabilized by sheets exfoliated from layered materials (e.g., substantially pristine and non-oxidized graphite or hexagonal boron nitride), and related methods of use.

Exfoliated sheets such as, for example, graphene or hexagonal boron nitride can be utilized to stabilize water-in-oil emulsions. Using certain oil phases, these emulsions can be very stable, lasting for months and displaying viscosities similar to mayonnaise. In certain embodiments, by utilizing long chain alkanes (e.g., hexadecane, which is a chain of 16 carbon atoms), one can advantageously fabricate emulsions with high viscosity and stability. In this form, the emulsions can be used as inks, thereby advantageously providing an inexpensive route to printing electrically conducting and/or insulating lines and shapes.

The inks can be applied with a brush, by screen printing, or other techniques (e.g., sprayed; ink-jetted; etc.) to produce conductive patterns on flexible surfaces such as, for example, cloth or plastic. Applications of such inks can include, without limitation, wearable electronics, flexible displays, bendable energy storage devices, and roll to roll produced solar cells.

In certain embodiments, the conductive ink is fabricated by exfoliating a layered material (e.g., substantially pristine and non-oxidized graphite) into individual sheets (e.g., individual graphene sheets), and using these sheets to stabilize water-in-oil emulsions. This stabilization is a result of kinetic trapping of graphene sheets or several layers of graphene flakes at a solvent/solvent interface. In exemplary embodiments, the systems/methods of the present disclosure advantageously produce emulsions of graphene/graphite with liquids (e.g., two non-mixing solvents, such as oil and water) on both the inside and the outside of the graphene/graphite.

In general, fabrication of the sheet stabilized emulsion based inks begins with a layered material (e.g., substantially pristine and non-oxidized graphite, such as graphene sheets or layers of graphite) being placed at the interface of a phase separated system (e.g., at an interface of two non-mixing solvents, such as a alkane/water system). In the interface trapping method, exfoliated sheets are instantly adsorbed to the high-energy liquid-liquid interface, where they are trapped because of the lowering of the interfacial energy of the system that the sheet provides. As more sheets are exfoliated, they climb up the interface to continue to minimize the interfacial energy as much as possible.

In order to continue the interfacial energy minimization, spheres are formed, thereby creating more surface area for the sheets (e.g., graphene/graphite sheets) to adsorb on to. The resulting emulsion can be utilized as a conductive ink (e.g., applied to a substrate to form an electrically conductive pattern on the substrate).

In one specific oil/water system, the emulsion consists of spheres of water, coated with graphene, and surrounded by at least one alkane (e.g., a long chain alkane; a high molecular weight (MW) alkane).

FIG. 1 shows exemplary lines 12 of ink printed on a substrate 10 (e.g., artificial leather; paper, etc.). As such, FIG. 1 illustrates some printed lines 12 of ink onto artificial leather 10. These lines 12 are electrically conductive, even when the substrate 10 is bent or twisted.

Printable inks can allow for the development of flexible electronics on various substrates 10 (e.g., paper or plastic). This in turn can enable applications such as, for example, wearable medical sensors, antennas, and even batteries and displays. The applicability of the advantageous inks of the present disclosure to screen-printing is important, as this can be the approach of choice for commercial printing (as opposed to the ink jet printing approach).

In exemplary embodiments, layered materials (e.g., graphite or hexagonal boron nitride) are exfoliated without the need for expensive or damaging approaches. By using long chain alkanes for the oil phase to stabilize the emulsions against coalescence, the advantageous emulsions can be fabricated. Using these emulsions, one can utilize them with standard screen printing to create/fabricate electrically conductive lines on substrates (e.g., paper, fabric, etc.).

It is noted that other approaches to using graphene in inks rely on either expensive and damaging oxidation or mechanical exfoliation. Oxidation creates defect sites on the graphene sheets that lowers the conductivity and leads to chemically unstable materials, while mechanical methods break the sheets into small fragments and degraded properties. In exemplary embodiments, the exfoliation systems and methods of the present disclosure advantageously produce large graphene sheets (e.g., about 1 μm sheets) in substantially pristine or pristine condition with negligible cost.

As described in U.S. Patent Pub. No. 2015/0307730 (the '730 publication), this publication attempts to provide a graphene ink from un-oxidized graphene. In an attempt to work, the formulation includes a hydrophobic solvent and a stabilizer, with ethyl cellulose being the stabilizer. The hydrocarbon described includes hexane, heptane, octane. The '730 publication reports attempting to exfoliate the graphite with sonication and the preponderance of very small (tens of nanometers) graphene flakes. By comparison, exemplary systems/methods of the present disclosure utilize water and a high MW alkane, do not require sonication, and contain/provide larger (e.g., about 1 μm sheets), and thus more conductive, graphene. In addition, the exemplary methods of the present disclosure do not require a dispersing agent as does the '730 publication.

Figures 2A, 2B, 2C:
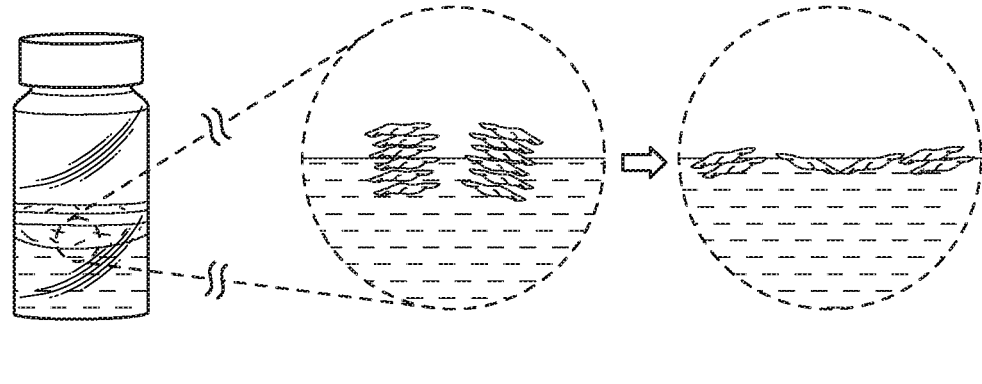
FIG. 2A depicts graphite trapped at the oil and water interface.
FIG. 2B is an illustration of graphite trapped in the oil and water interface.
FIG. 2C is an illustration of graphite that exfoliates into graphene at the oil and water interface.

It is noted that FIG. 2A of the present disclosure depicts graphite trapped at the oil and water interface. FIG. 2B is an illustration of graphite trapped in the oil and water interface. FIG. 2C is an illustration of graphite that exfoliates into graphene at the oil and water interface.

Figures 3A, 3B, 3C:
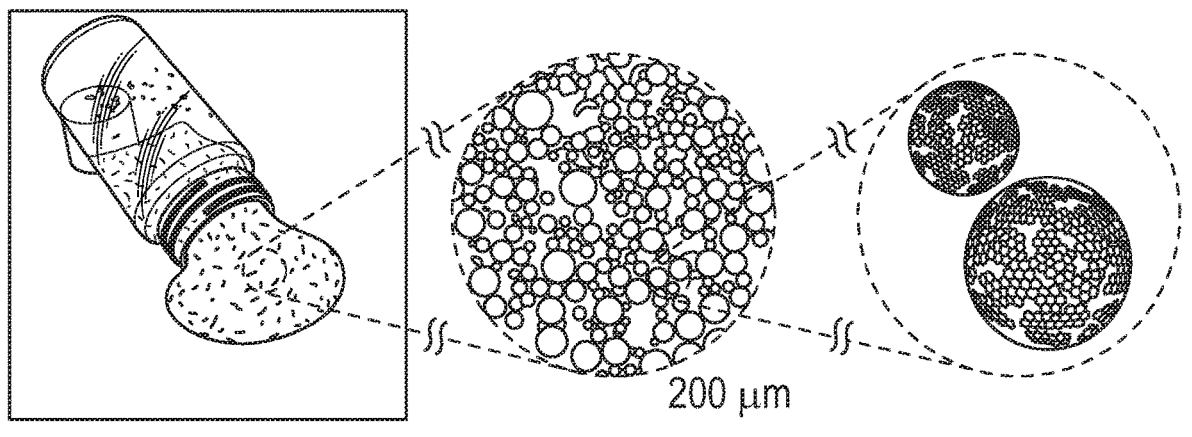
FIG. 3A shows a graphene emulsion ink poured onto paper.
FIG. 3B is an optical image of the graphene emulsion ink (ink was diluted using oil phase to separate the spheres)
FIG. 3C is an illustration of a water-in-oil emulsion with graphene stabilizing the interface.

FIG. 3A shows a graphene emulsion ink poured onto paper. FIG. 3B is an optical image of the graphene emulsion ink (ink was diluted using oil phase to separate the spheres).

FIG. 3C is an illustration of a water-in-oil emulsion with graphene stabilizing the interface.

Figure 4A:
FIG. 4A displays a UCONN logo printed on paper using a graphene emulsion ink.
Figure 4B:
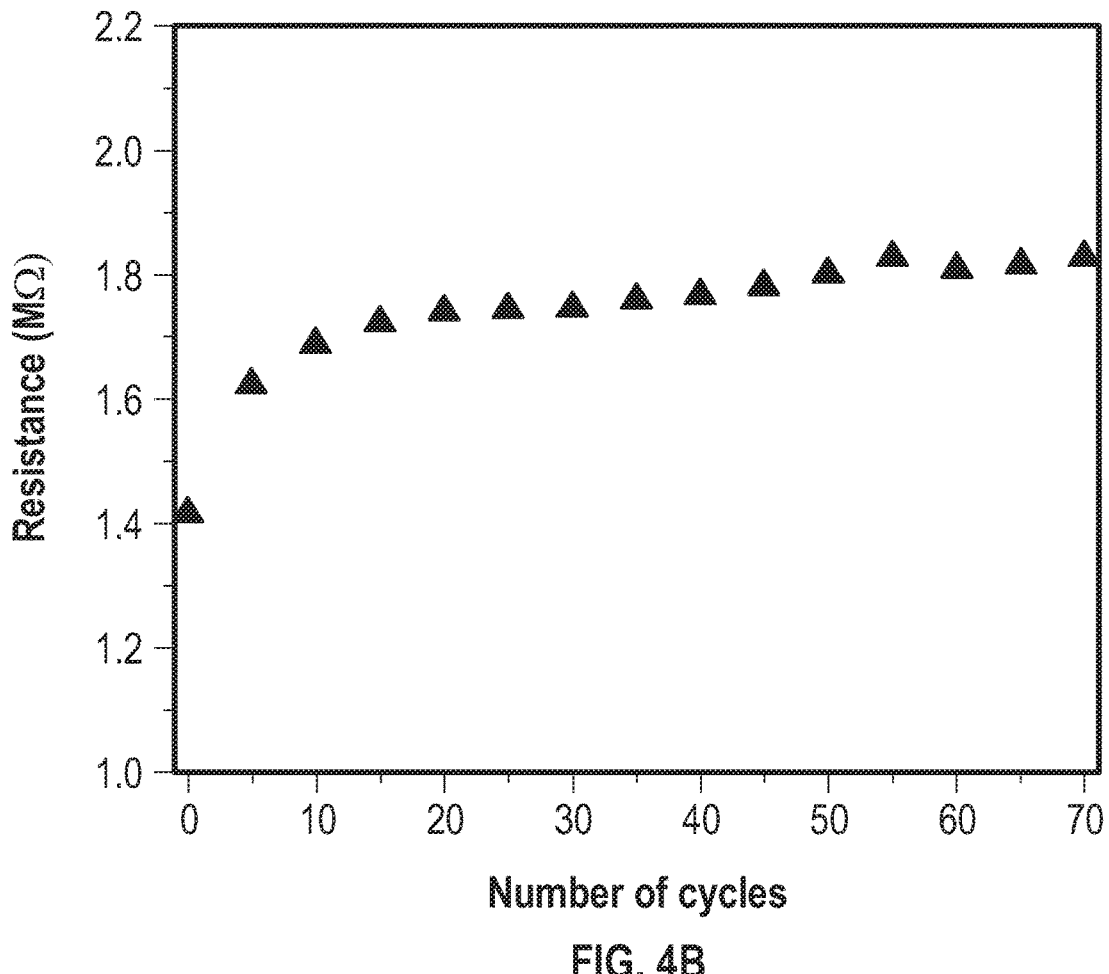
FIG. 4B shows a plot of resistance of a printed ink line vs. the number of cycles the ink line is rolled into a 7.62 cm diameter tube.

FIG. 4A displays a UCONN logo printed on paper using a graphene emulsion ink. FIG. 4B shows a plot of resistance of a printed ink line versus the number of cycles the ink line is rolled into a 7.62 cm diameter tube.

Figure 5:
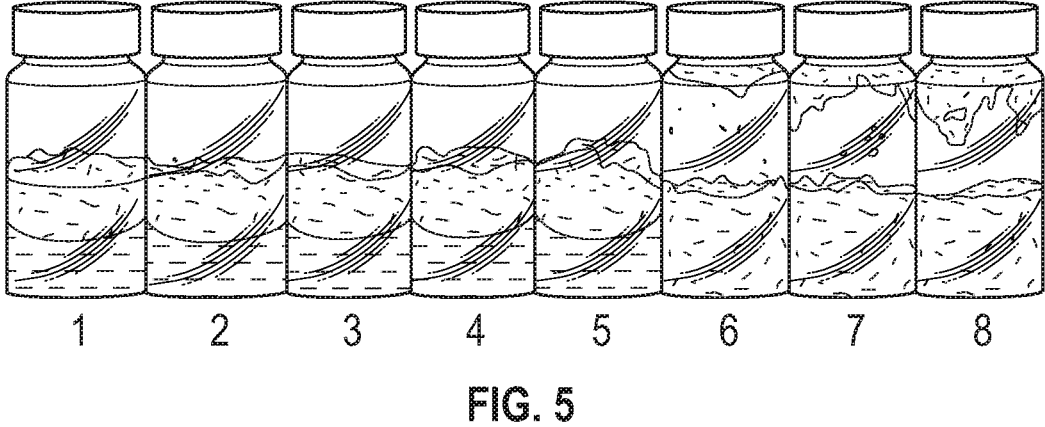
FIG. 5 shows different exfoliation stages of graphene ink prepared using increasing graphite loading from vial 1 to vial 8; all eight vials had 3 ml of C16 (hexadecane), 7 ml of DI $H_2O$, and the graphite loading of each vial was as follows: vial 1: 0.01 g, vial 2: 0.02 g, vial 3: 0.03 g, vial 4: 0.04 g, vial 5: 0.05 g, vial 6: 0.1 g, vial 7: 0.2 g, vial 8: 0.3 g; this image shows after day one, after each vial was shaken for 40 s.

FIG. 5 shows different exfoliation stages of graphene ink prepared using increasing graphite loading from vial 1 to vial 8. All eight vials had 3 ml of C16 (hexadecane), 7 ml of DI H$_2$O, and the graphite loading of each vial was as follows: vial 1: 0.01 g, vial 2: 0.02 g, vial 3: 0.03 g, vial 4: 0.04 g, vial 5: 0.05 g, vial 6: 0.1 g, vial 7: 0.2 g, vial 8: 0.3 g; this image shows after day one, after each vial was shaken for 40 seconds.

Figure 6:
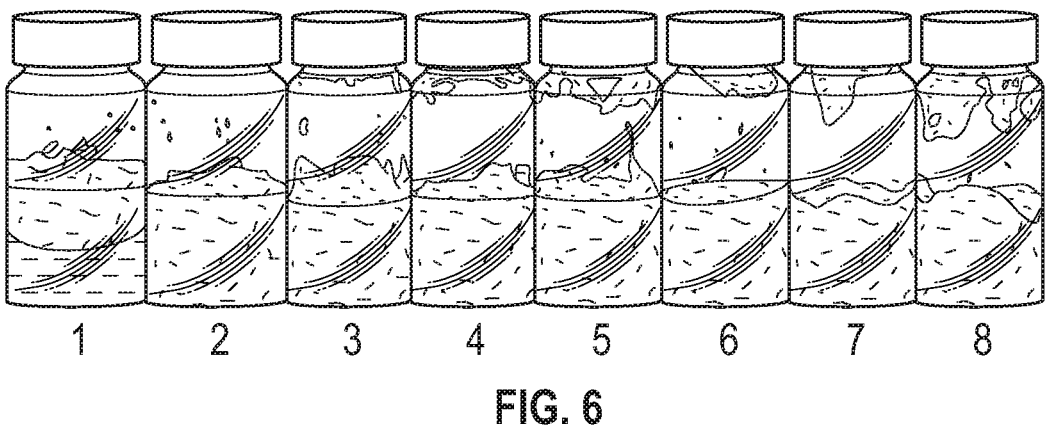
FIG. 6 shows different exfoliation stages of graphene ink prepared using increasing graphite loading from vial 1 to vial 8; all eight vials had 3 ml of C16 (hexadecane), 7 ml of DI $H_2O$, and the graphite loading of each vial was as follows: vial 1: 0.01 g, vial 2: 0.02 g, vial 3: 0.03 g, vial 4: 0.04 g, vial 5: 0.05 g, vial 6: 0.1 g, vial 7: 0.2 g, vial 8: 0.3 g; this image shows after day two, after each vial was shaken again for 40 s.

FIG. 6 shows different exfoliation stages of graphene ink prepared using increasing graphite loading from vial 1 to vial 8. All eight vials had 3 ml of C16 (hexadecane), 7 ml of DI H$_2$O, and the graphite loading of each vial was as follows: vial 1: 0.01 g, vial 2: 0.02 g, vial 3: 0.03 g, vial 4: 0.04 g, vial 5: 0.05 g, vial 6: 0.1 g, vial 7: 0.2 g, vial 8: 0.3 g; this image shows after day two, after each vial was shaken again for 40 seconds.

Figure 7:
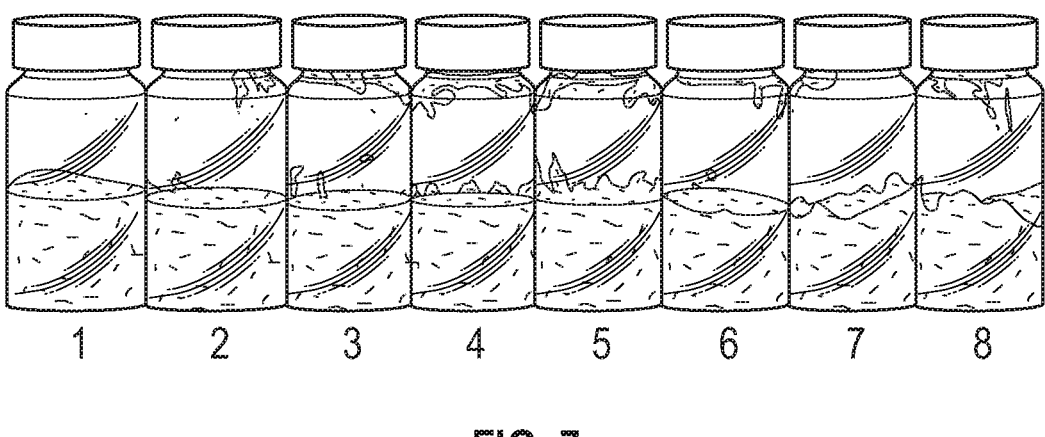
FIG. 7 shows different exfoliation stages of graphene ink prepared using increasing graphite loading from vial 1 to vial 8; all eight vials had 3 ml of C16 (hexadecane), 7 ml of DI $H_2O$, and the graphite loading of each vial was as follows: vial 1: 0.01 g, vial 2: 0.02 g, vial 3: 0.03 g, vial 4: 0.04 g, vial 5: 0.05 g, vial 6: 0.1 g, vial 7: 0.2 g, vial 8: 0.3 g; this image shows after day twelve, after each vial was shaken again at day five and day twelve for 40 s.

FIG. 7 shows different exfoliation stages of graphene ink prepared using increasing graphite loading from vial 1 to vial 8. All eight vials had 3 ml of C16 (hexadecane), 7 ml of DI H$_2$O, and the graphite loading of each vial was as follows: vial 1: 0.01 g, vial 2: 0.02 g, vial 3: 0.03 g, vial 4: 0.04 g, vial 5: 0.05 g, vial 6: 0.1 g, vial 7: 0.2 g, vial 8: 0.3 g; this image shows after day twelve, after each vial was shaken again at day five and day twelve for 40 seconds.

Figure 8:
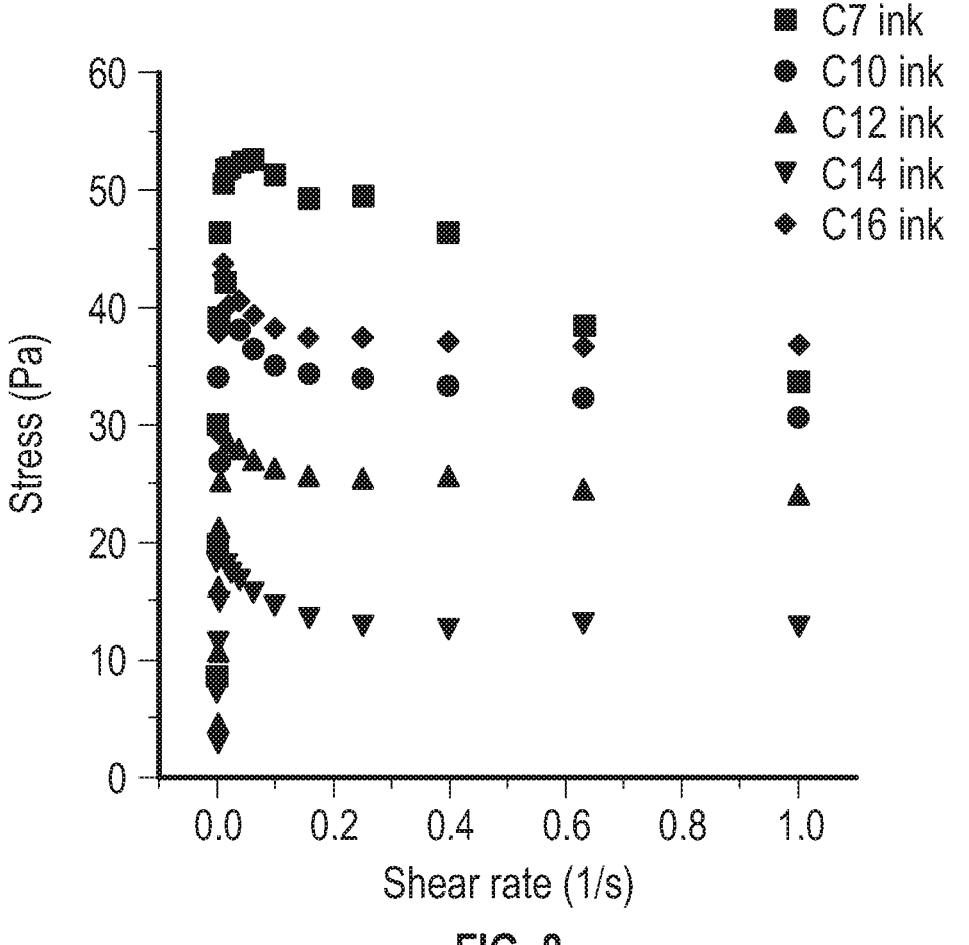
FIG. 8 shows stress vs. shear rate at 25° C. of inks prepared by using a different alkane as the oil phase (C7: heptane, C10: octane, C12: dodecane; C14: tetradecane; C16: hexadecane)

FIG. 8 shows stress versus shear rate at 25° C. of inks prepared by using a different alkane as the oil phase (C7: heptane, C10: octane, C12: dodecane; C14: tetradecane; C16: hexadecane).

Figure 9:
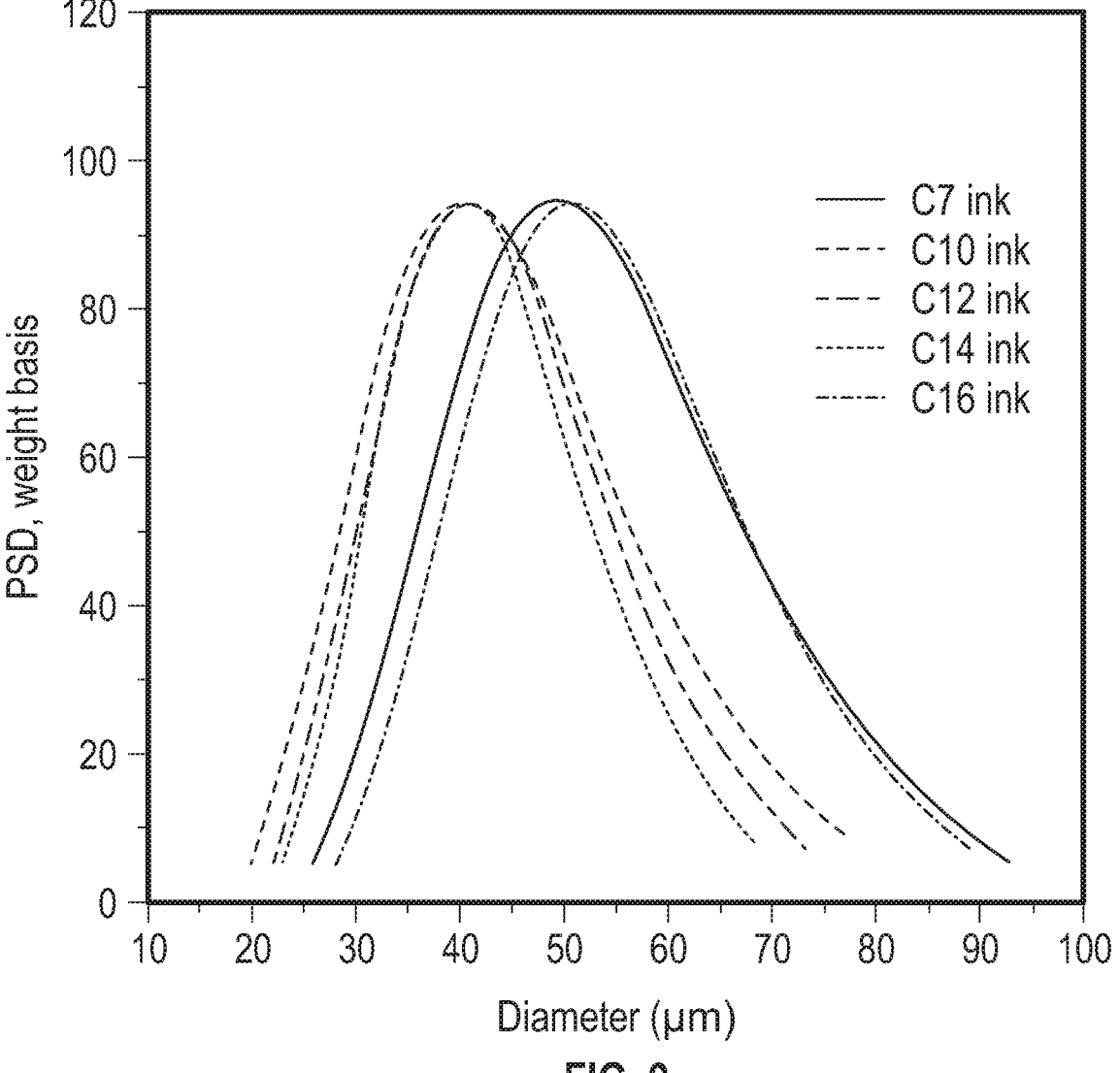
FIG. 9 shows an emulsion size distribution of different inks (C7: heptane, C10: octane, C12: dodecane; C14: tetradecane; C16: hexadecane)

FIG. 9 shows an emulsion size distribution of different inks (C7: heptane, C10: octane, C12: dodecane; C14: tetradecane; C16: hexadecane).

Figure 10:
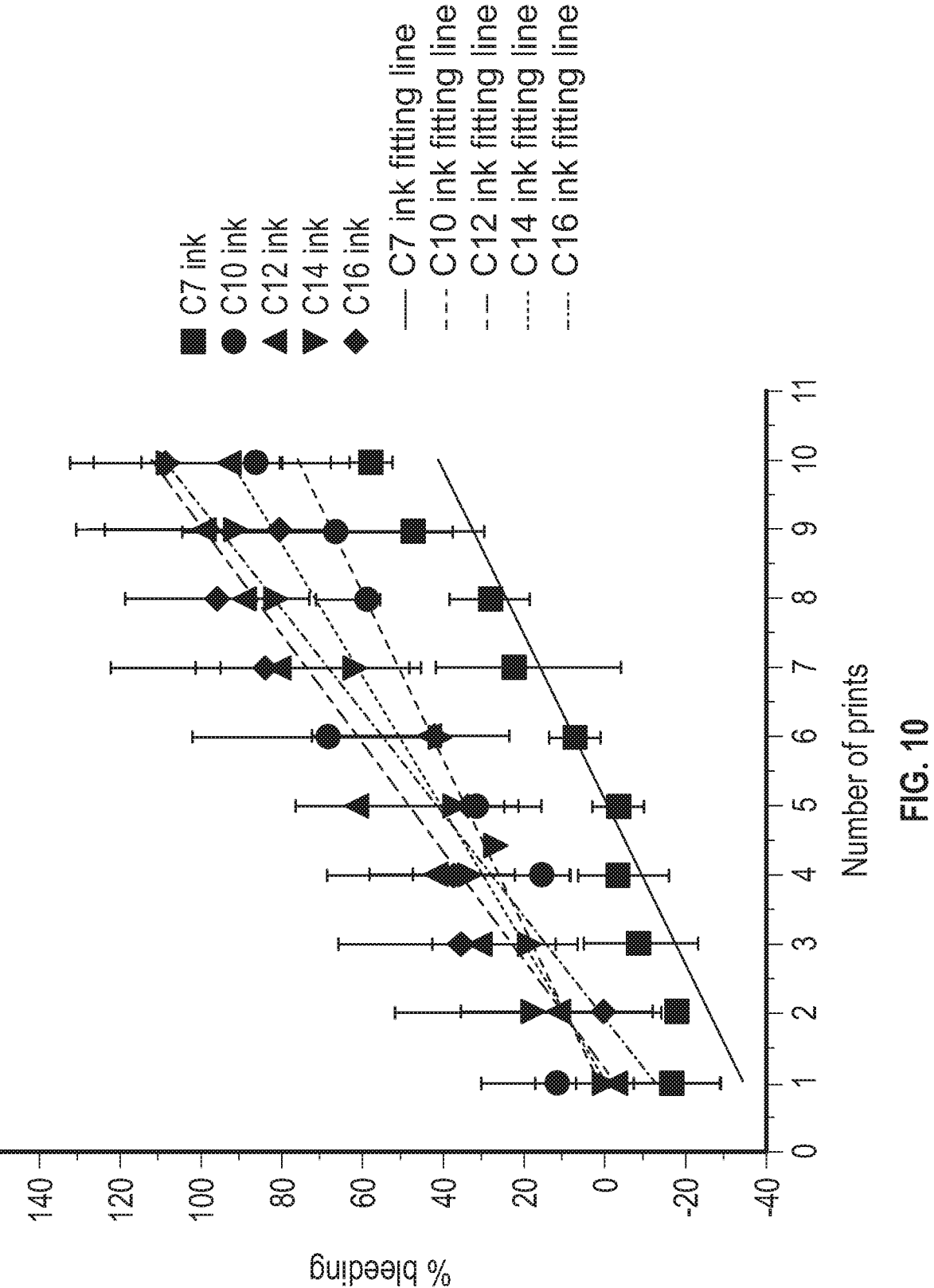
FIG. 10 shows the percent bleeding of lines printed using different inks on paper vs. the number of prints each line was (repeatedly) printed; (C7: heptane, C10: octane, C12: dodecane; C14: tetradecane; C16: hexadecane)

FIG. 10 shows the percent bleeding of lines printed using different inks on paper versus the number of prints each line was (repeatedly) printed (C7: heptane, C10: octane, C12: dodecane; C14: tetradecane; C16: hexadecane).

Figure 11:
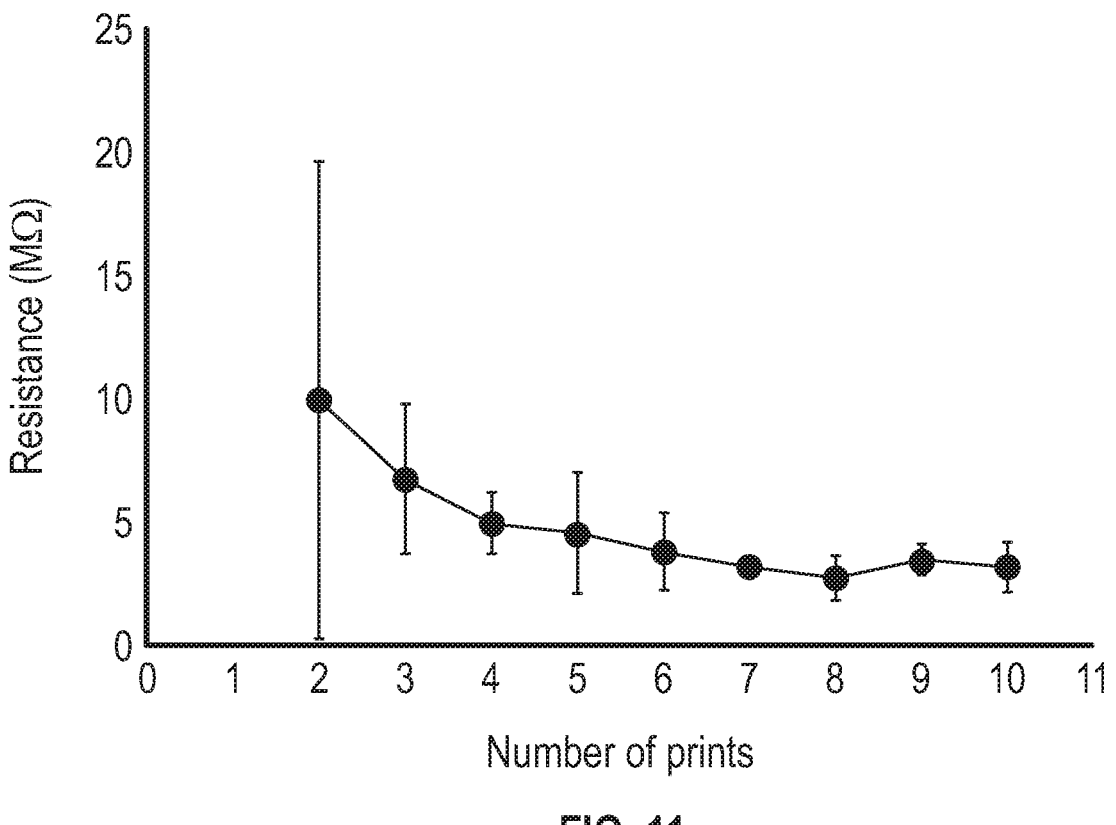
FIG. 11 shows the resistance of a 4 pt width, 5 cm length C16 ink line versus the number of prints.

FIG. 11 shows the resistance of a 4 pt width, 5 cm length C16 ink line versus the number of prints.

Figures 12A, 12B, 12C:
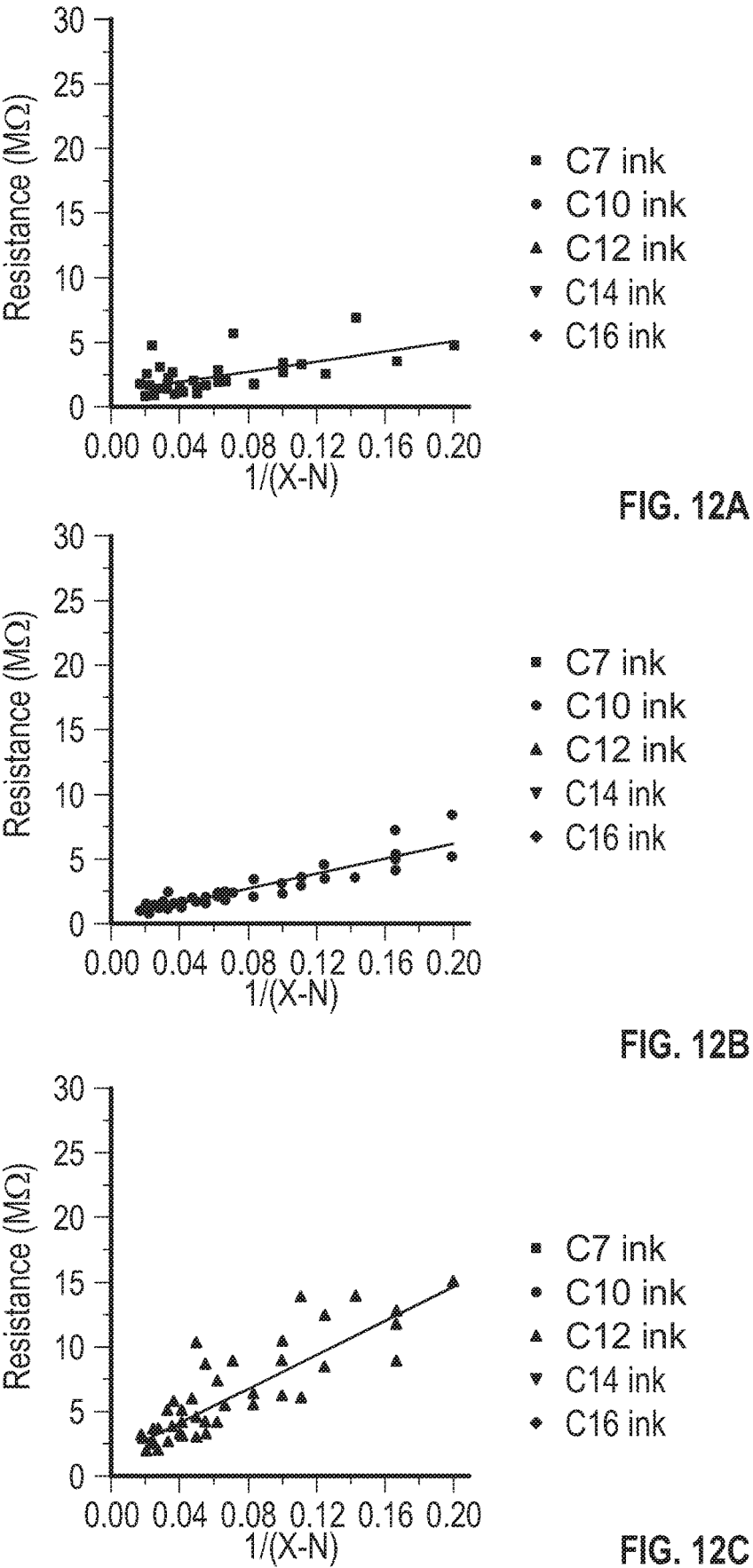
FIGS. 12A-12E show the resistance vs. 1/(X·N) of different inks.
Figure 12D:
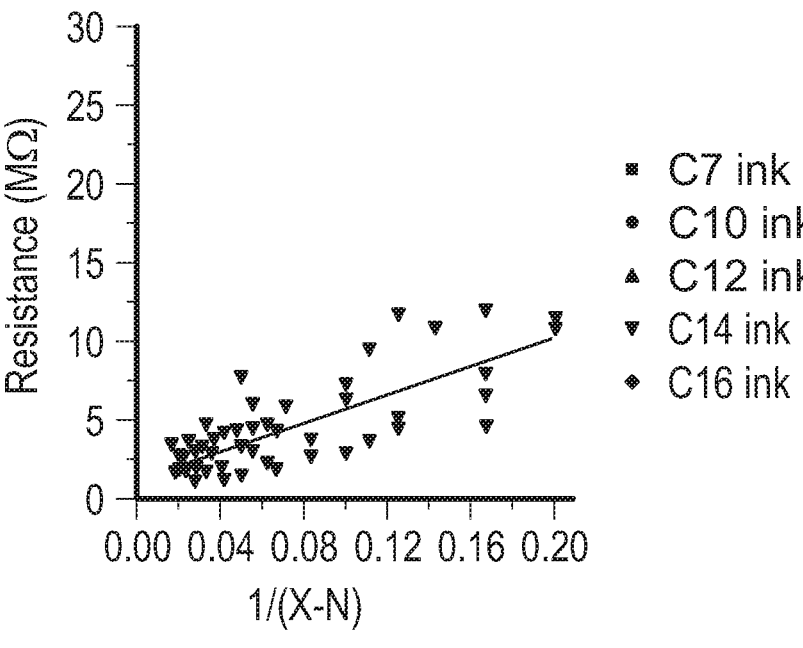
Figure 12E:
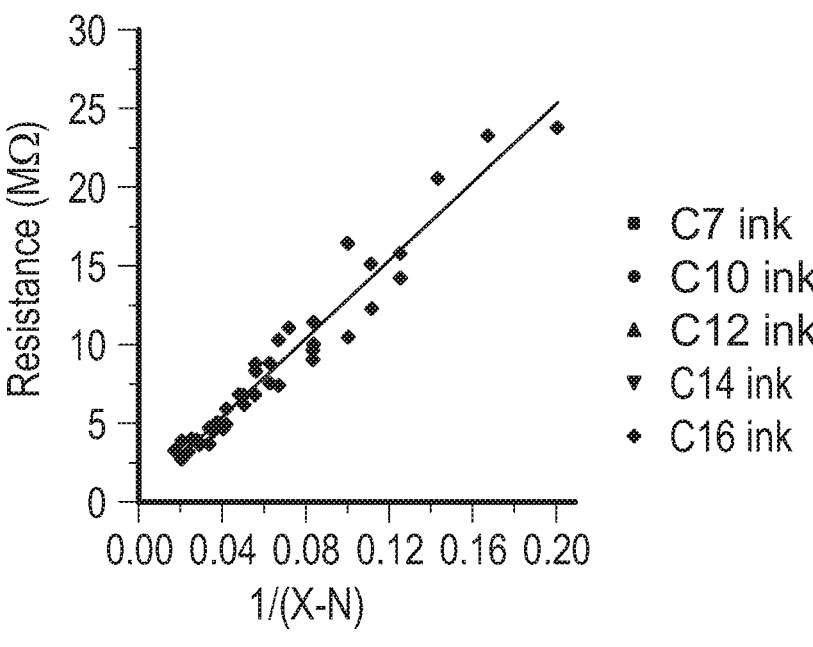

FIGS. 12A-12E show the resistance versus 1/(X·N) of different inks. FIG. 12A is C7 ink. FIG. 12B is C10 ink. FIG. 12C is C12 ink. FIG. 12D is C14 ink. FIG. 12E is C16 ink.

Table 1 below shows the hysteresis of different alkanes with graphene.

TABLE 1

| Solvent | Average advancing weight gain (mg) | Average receding weight retained (mg) | Hysteresis |
|---|---|---|---|
| C7 | 32.6 | 37.7 | 0.157 |
| C10 | 39.5 | 44.8 | 0.133 |
| C12 | 41.3 | 43.9 | 0.064 |
| C14 | 45.7 | 45.8 | 0.001 |
| C16 | 40.2 | 45.1 | 0.120 |

With Equation 1:

$$R = \frac{1}{X \times N} R_0$$

And where:
R: resistance of the printed line (Me)
X: Width of the line (pt)

N: Number of prints on the same line $R_0$: resistance per print per points of the line (M$\Omega$·print$^{-1}$·pt$^{-1}$)

Table 2 below shows the Resistance per print per points ($R_0$) of different inks and the coefficient of determination ($R^2$) of different inks.

TABLE 2

| Ink | $R_0$ (M$\Omega$•print$^{-1}$•pt$^{-1}$) | $R^2$ |
|---|---|---|
| C7 ink | 19.57 | 0.35 |
| C10 ink | 28.91 | 0.84 |
| C12 ink | 64.97 | 0.72 |
| C14 ink | 44.17 | 0.58 |
| C16 ink | 124.18 | 0.95 |

The present disclosure will be further described with respect to the following examples; however, the scope of the disclosure is not limited thereby. The following examples illustrate the advantageous systems/methods of the present disclosure of fabricating improved conductive inks derived from water-in-oil emulsions stabilized by sheets exfoliated from layered materials.

EXAMPLE 1

An exemplary sample of ink can be produced/fabricated by adding graphite flakes to water and hexadecane (e.g., three to one ratio of water to hexadecane in some embodiments; nearly equal volumes of water and hexadecane in other embodiments). This mixture is then mixed or shaken (e.g., via hand mixing, hand shaking, mechanical mixing, mechanical shaking, and combinations thereof) for an amount of time (e.g., for less than ten seconds) to produce the emulsion/ink.

The ink is stable to coalescence relative to the length of time investigating it (e.g., substantially no coalescence observed for more than three months). The mayonnaise-like consistency (e.g., about 15,000 cP, but can be varied; in some embodiments the emulsion has a steady state viscosity of about 4,000,000 cP shear thinning to about 15,000 cP) of the ink is perfect for screen printing, and numerous printed designs have been fabricated.

Current research is concerned with exploring the use of different alkanes and ratios of alkanes, as well as different graphite flake sizes.

An initial alkane utilized in the fabrication method was C16 (hexadecane). Current tests include inks made with various ratios of C16 and C7 (heptane) during the fabrication method.

Some findings thus far are that the C16 can be cut with C7 to a significant extent without losing the high viscosity of the resultant ink/emulsion.

With just only C7, however, the emulsion flows freely. In addition, one can test graphene with larger flake sizes.

Some embodiments utilize around 1 μm flakes (1 μm equals 1,000 nanometers). This is due the fast exfoliation of this size flake. Larger flakes, however, are expected to be more conductive, and one can utilize mixing techniques and/or microwaves in efforts to make inks with larger flakes in a reasonable amount of time.

Another direction one can take is to utilize longer alkanes (e.g., larger than C18, octadecane) with higher melting temperatures. These are typically called waxes, and should be able to form emulsions either at elevated temperatures or when cut with C7. If one is able to use waxes with high melting temperatures in the emulsification process, then remove the water and C7, one may be able to make very low density conductive pastes. These approaches can lead to the control of viscosity and rheological properties of the ink, and provide a pathway for meeting a range of industrial needs.

In printing applications, it has been noted that the conductivity of the lines 12 increases with multiple prints. This is important for understanding the mechanism, but also for allowing for changing conductivity on the same surface/substrate. This is an aspect that more expensive silver based inks lack, and is useful for various applications where the material interacts with electromagnetic waves.

Whereas the disclosure has been described principally in connection with graphite and/or graphene, such description has been utilized for purposes of disclosure and is not intended as limiting the disclosure. To the contrary, it is recognized that the disclosed systems, methods, techniques and assemblies are capable of use with other materials having a layered structure or the like, such as, for example, boron nitride (e.g., hexagonal or graphitic boron nitride) or graphene oxide or the like.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A flowable conductive ink configured for use in an electronic device, the flowable conductive ink comprising:
  a combination of a first solvent and a second solvent, wherein the first and second solvents define an interface therebetween;
  a volume of sheet materials distributed at the interface between the first and second solvents based on mixing of the combination;
  the flowable conductive ink exhibiting a resistance suited for use in an electronic device;
  wherein the second solvent comprises an alkane selected from the group consisting of hexadecane, a longer chain alkane than hexadecane or a combination thereof; and wherein the flowable conductive ink exhibits substantially no coalescence for at least three months.

2. The flowable conductive ink as in claim 1, wherein the first solvent comprises water.

3. The flowable conductive ink as in claim 1, wherein the oil comprises hexadecane.

4. The flowable conductive ink as in claim 1, wherein the sheet materials comprise at least one of graphene or graphite.

5. The flowable conductive ink as in claim 1, wherein the flowable conductive ink exhibits a viscosity between 15,000 cP and 4,000,000 cP.

6. The flowable conductive ink as in claim 1, wherein the flowable conductive ink exhibits a shelf life of at least three months.

7. The flowable conductive ink as in claim 1, wherein the sheet materials comprise flakes with an average size of 1 micrometer ($\mu$m).

8. The flowable conductive ink as in claim 1, characterized by at least one of: electrical conductivity and properties suited for at least one of screen-printing, brushing, spraying and use in an ink-jet.

9. The conductive ink as in claim 1, wherein the device comprises at least one of: a wearable textile, an antenna, electromagnetic interference (EMI) shielding, a printed electronic device, an indium tin oxide (ITO) replacement, a bio-sensor, printed memory, an organic light emitting diode (OLED), LED lighting, a heater, a flexible display, an energy storage device, a solar cell, a cloth substrate, and a plastic substrate.

10. An ink comprising a flowable stabilized emulsion of non-mixing solvents, the ink comprising:
  a combination of a first solvent that comprises water and a second solvent that comprises a mixture of at least two alkanes, wherein the first and second solvents define an interface therebetween;
  a volume of graphite flakes distributed at the interface between the first and second solvents based on mixing of the combination;
  wherein the combination of the first and second solvents and the volume of sheet materials define the flowable stabilized emulsion; and
  wherein the second solvent comprises an alkane selected from the group consisting of hexadecane, a longer chain alkane than hexadecane or a combination thereof; and
  wherein the ink exhibits substantially no coalescence for at least three months.

11. The ink as in claim 10, wherein the at least two alkanes comprise heptane and hexadecane.

12. The ink as in claim 10, wherein the flowable stabilized emulsion exhibits a viscosity within a range of 15,000 cP to 4,000,000 cP.

13. The ink as in claim 10, wherein the ink exhibits a shelf life of at least three months.

* * * * *